(12) United States Patent
Shinohara

(10) Patent No.: US 8,360,528 B2
(45) Date of Patent: Jan. 29, 2013

(54) VEHICLE SEATS

(75) Inventor: Kenji Shinohara, Nissin (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 587 days.

(21) Appl. No.: 12/527,634

(22) PCT Filed: Dec. 12, 2007

(86) PCT No.: PCT/JP2007/073938
§ 371 (c)(1),
(2), (4) Date: Sep. 18, 2009

(87) PCT Pub. No.: WO2008/102506
PCT Pub. Date: Aug. 28, 2008

(65) Prior Publication Data
US 2010/0109411 A1 May 6, 2010

(30) Foreign Application Priority Data
Feb. 23, 2007 (JP) ................................. 2007-043336

(51) Int. Cl.
*B60N 2/04* (2006.01)
(52) U.S. Cl. .................................. 297/378.12; 296/65.09
(58) Field of Classification Search ............. 297/378.12; 296/65.09
See application file for complete search history.

(56) References Cited

U.S. PATENT DOCUMENTS

| 5,393,116 | A | 2/1995 | Bolsworth et al. | |
| 6,345,867 | B1 * | 2/2002 | Hellrung et al. | 297/378.12 |
| 6,698,837 | B2 * | 3/2004 | Pejathaya et al. | 297/378.12 X |
| 7,152,922 | B2 * | 12/2006 | Garland | 297/362.11 |
| 7,325,876 | B2 * | 2/2008 | Lavoie et al. | 297/378.12 |
| 2001/0052718 | A1 | 12/2001 | Sugiura et al. | |
| 2004/0251705 | A1 * | 12/2004 | Tame et al. | 296/65.09 X |

FOREIGN PATENT DOCUMENTS

| EP | 1040960 | 10/2000 |
| GB | 2251183 | 7/1992 |
| JP | 2951878 B2 | 7/1999 |
| JP | 2001-347864 | 12/2001 |
| JP | 2002-370565 | 12/2002 |
| JP | 2006-051869 | 2/2006 |
| JP | 2006-315568 | 11/2006 |
| WO | 2004/080751 | 9/2004 |

OTHER PUBLICATIONS

English Language Abstract of JP 2006-315568, Nov. 24, 2006.
English Language Abstract of JP 2006-051869, Feb. 23, 2006.
English Language Abstract of JP 2002-370565, Dec. 24, 2002.
English Language Abstract of JP 2001-347864, Dec. 18, 2001.

(Continued)

*Primary Examiner* — Anthony D Barfield
(74) *Attorney, Agent, or Firm* — Greenblum & Bernstein, P.L.C.

(57) ABSTRACT

In a vehicle seat, by turning-control a control lever, a locked state of a reclining device is cancelled, to thereby bring a seat back into a forward foldable state. When the seat back is switched into the forward folding state while maintaining the operating state of the control lever, the interlocked state between the vehicle seat and a floor is cancelled. However, when the operating state of the control lever is cancelled while the seat back is folded forward, the interlocked state between the vehicle seat and the floor is maintained.

6 Claims, 7 Drawing Sheets

OTHER PUBLICATIONS

U.S. Appl. No. 12/515,060 to Kuno et al., filed May 15, 2009.
U.S. Appl. No. 12/515,066 to Kuno et al., filed May 15, 2009.
U.S. Appl. No. 12/524,767 to Yamashita et al., filed Jul. 28, 2009.
U.S. Appl. No. 12/525,231 to Yamashita et al., filed Jul. 30, 2009.
Office Action in related Japanese Application No. 2009-500070, dated Sep. 4, 2012, along with an English language translation thereof.
Search report from E.P.O., mail date is Jan. 4, 2011.

* cited by examiner

VEHICLE SEATS

TECHNICAL FIELD

The present invention relates to a vehicle seat, and more particularly to a vehicle seat capable of moving, in a state of folded posture in which a seat back is folded down, from an installation position on a floor to a storage position in vehicle interior so as to be stored in the storage position through forward folding of the seat back and canceling of an interlocked state between the vehicle seat and the floor.

BACKGROUND ART

Conventionally, some vehicle seats are provided with a function of setting an installation area therefore to be opened by switching the vehicle seats to a state of storage posture. This storage function is operated by controlling a control lever provided in the seat. Specifically, first, through control of the control lever, a locked state of a reclining device is cancelled. Thus, the seat back may be folded forward, and the seat may be switched to a state of folded posture.

After that, through further control of the control lever, a locked state of a lock device, which engages the seat and the floor with each other, is cancelled. Thus, the entire seat in the state of folded posture may be tipped up from the floor, or may be moved down into a recess in the floor, whereby the seat is stored.

Here, JP 2001-347864 A discloses a technology provided with an erroneous operation preventing function of preventing the seat from being moved and stored in storage control of the seat unless the seat back is folded forward. In this disclosure, through control of a first lever provided for canceling the locked state of the reclining device, the locked state of the reclining device is cancelled and the seat back is folded forward.

Then, in conjunction with this movement, a second lever provided for canceling the locked state of the lock device which engages the seat with the floor is switched to enter into a controllable state. Therefore, through control of the second lever in this state, the engaged state between the seat and the floor is cancelled, and hence the seat can be moved from the installation position on the floor to the storage position.

Thus, there is a need in the art to improve the above-mentioned conventional control structure of a vehicle seat.

SUMMARY

That is, a vehicle seat according to the present invention is capable of moving, in a state of folded posture in which a seat back is folded down, from an installation position on a floor to a storage position in a vehicle interior so as to be stored in the storage position through forward folding of the seat back and canceling of an interlocked state between the vehicle seat and the floor. The vehicle seat includes a first lock canceling mechanism and a second lock canceling mechanism. The first lock canceling mechanism is capable of releasably fixing a backrest angle of the seat back with respect to a seat cushion. The second lock canceling mechanism is capable of engaging/disengaging the vehicle seat with respect to the floor. The first lock canceling mechanism is usually maintained in a state in which the backrest angle of the seat back is fixed, and cancels the fixed state of the backrest angle through canceling control of a control member provided in the vehicle seat so as to switch the seat back into a forward foldable state. The second lock canceling mechanism is usually maintained in a state in which the vehicle seat is interlocked with the floor. Further, the second lock canceling mechanism operates so as to cancel the interlocked state between the vehicle seat and the floor when the seat back enters into a forward folded state while the control member is cancel-controlled and an operating state of the control member is maintained. However, the second lock canceling mechanism keeps the interlocked state between the vehicle seat and the floor when the operating state of the control member is cancelled while the seat back is folded forward.

According to the configuration of the present invention, through the canceling control of the control member, the seat back is folded forward. In this case, by stopping the canceling control of the control member while the seat back is folded forward, the vehicle seat keeps the interlocked state with respect to the floor and remains in a posture state in which the seat back is folded forward. However, in the vehicle seat, the canceling control of the control member is continued when the seat back is folded forward, and hence the interlocked state with respect to the floor is cancelled. As described above, selective switching whether or not the interlocked state between the vehicle seat and the floor may be carried out by one-time control that is selecting whether or not the canceling control of the control member is continued. Therefore, such selective switching control can be easily performed without erroneous operation.

Further, the configuration of the present invention may be as follows. That is, a vehicle seat further includes: a first control member as the control member provided so as to be turning-controlled with respect to the vehicle seat; and a second control member provided so as to be turning-controlled integrally with the first control member by engagement with the first control member. The first control member includes a first guide path extending in a plane perpendicular to a center axis of turning thereof. The second control member includes a second guide path extending in a plane perpendicular to a center axis of turning thereof. A slide member is provided between the first guide path and the second guide path so as to pivotally pass through the first guide path and the second guide path. The slide member is moved so as to slide along guiding shapes of the first guide path and the second guide while the guiding shapes are arranged at the corresponding position. However, the slide member forcibly turns and shifts one of the first control member and the second control member with respect to another one, and arranges the guiding shapes of the first guide path and the second guide path at the corresponding position by sliding movement of the slide member when extending directions of the guiding shapes are different from each other. The first lock canceling mechanism, which fixes the backrest angle of the seat back, is cancel-controlled through turning of the first control member to a first turning position. The first control member, when turning to the first turning position, turns without interfering the slide member along the guiding shape of the first guide path, and turns relatively to the second control member. The fixed state of the backrest angle is cancelled, and the seat back falls forward. In conjunction with this movement, the slide member is controlled and slides, thereby the slide member forcibly shifts the guide paths directed in different directions. Then, the second control member turns with respect to the first control member by the movement of the slide member. Thereby, the second lock canceling mechanism, which interlocks the vehicle seat and the floor with each other, is cancel-controlled.

According to the configuration of the present invention, by turning-controlling the first control member to the first turning position, the fixed state of the backrest angle of the seat back is cancelled. In this case, the first control member turns without interfering the slide member along the guiding shape of the first guide path. Therefore, the second control member is maintained at the initial position without turning in conjunction with the first control member. However, when the seat back which is released from the fixed state is folded forward, the slide member is controlled by this movement to be forcibly shifted and the second control member is forcibly turned and shifted by the slide member. Thereby, the interlocked state between the vehicle seat and the floor is cancelled. Thus, there can be obtained the configuration for preventing canceling of the interlocked state between the vehicle seat and the floor unless the seat back is folded forward.

Further, the configuration of the present invention may be as follows. That is, the first guide path and the second guide path are formed to have the guiding shapes which conform to each other in a state in which the first control member is at an initial position before being subjected to turning control.

According to the configuration of the present invention, by stopping the control of the first control member while the seat back is folded forward, the guiding shapes of the first guide path and the second guide path conform to each other. Therefore, if the seat back is folded forward in this state, the slide member is moved in the guide paths conformed to each other. Thus, the second control member is maintained at the initial position without being subjected to turning control. Thus, there can be obtained the configuration capable of interlocking the vehicle seat with the floor in the state in which the seat back is folded forward in a case where the canceling control of the control member is stopped halfway.

Further, the configuration of the present invention may be as follows. That is, control of the first control member is stopped while the seat back is folded forward and the first control member is returned to the initial position. Thus, the guiding shapes of the first guide path and the second guide path conform to each other in conjunction with forward folding movement of the seat back, and the slide member is moved along the conformed guiding shapes. Thereby, the first control member and the second control member integrally engage with each other in a turning direction.

According to the configuration of the present invention, in the state in which the seat back is folded forward, the slide member is moved in the guide paths conforming each other, to thereby cause the first control member and the second control member to integrally engage with each other in the turning direction. Therefore, in this state, by performing the turning control of the first control member again, the slide member serves as an engagement portion, and the second control member is turning-controlled integrally with the first control member. Therefore, by performing again the turning control of the first control member which is stopped being controlled once, it is possible to cancel the interlocked state between the floor and the vehicle seat having the seat back in the forward folded posture.

Further, the configuration of the present invention may be as follows. That is, the first control member and the second control member are pivotally turnably supported by a common shaft member. According to the configuration of the present invention, the first control member and the second control member turn about the common shaft member at the coaxial position, and hence the entire configuration can be made to be compact and assembled components can be rationalized.

Further, the configuration of the present invention may be as follows. That is, the first control member and the second control member are formed into a flat-plate shape. The first guide path and the second guide path are formed as elongated holes formed in the first control member and the second control member so as to pass therethrough in a plate thickness direction. The slide member is constituted as an engagement pin inserted through the elongated holes.

According to the configuration of the present invention, the first guide path and the second guide path are formed as the elongated holes formed in the flat-plate-like first control member and the second control member so as to pass therethrough in the plate thickness direction. Further, the slide member, which is inserted through the first guide path and the second guide path, is constituted as the engagement pin inserted through the elongated holes. Thus, the configuration of the present invention can be realized.

BEST MODE FOR CARRYING OUT THE INVENTION

Hereinafter, the preferred embodiment of the present invention is described with reference to the drawings.

First Embodiment

Figure 1:
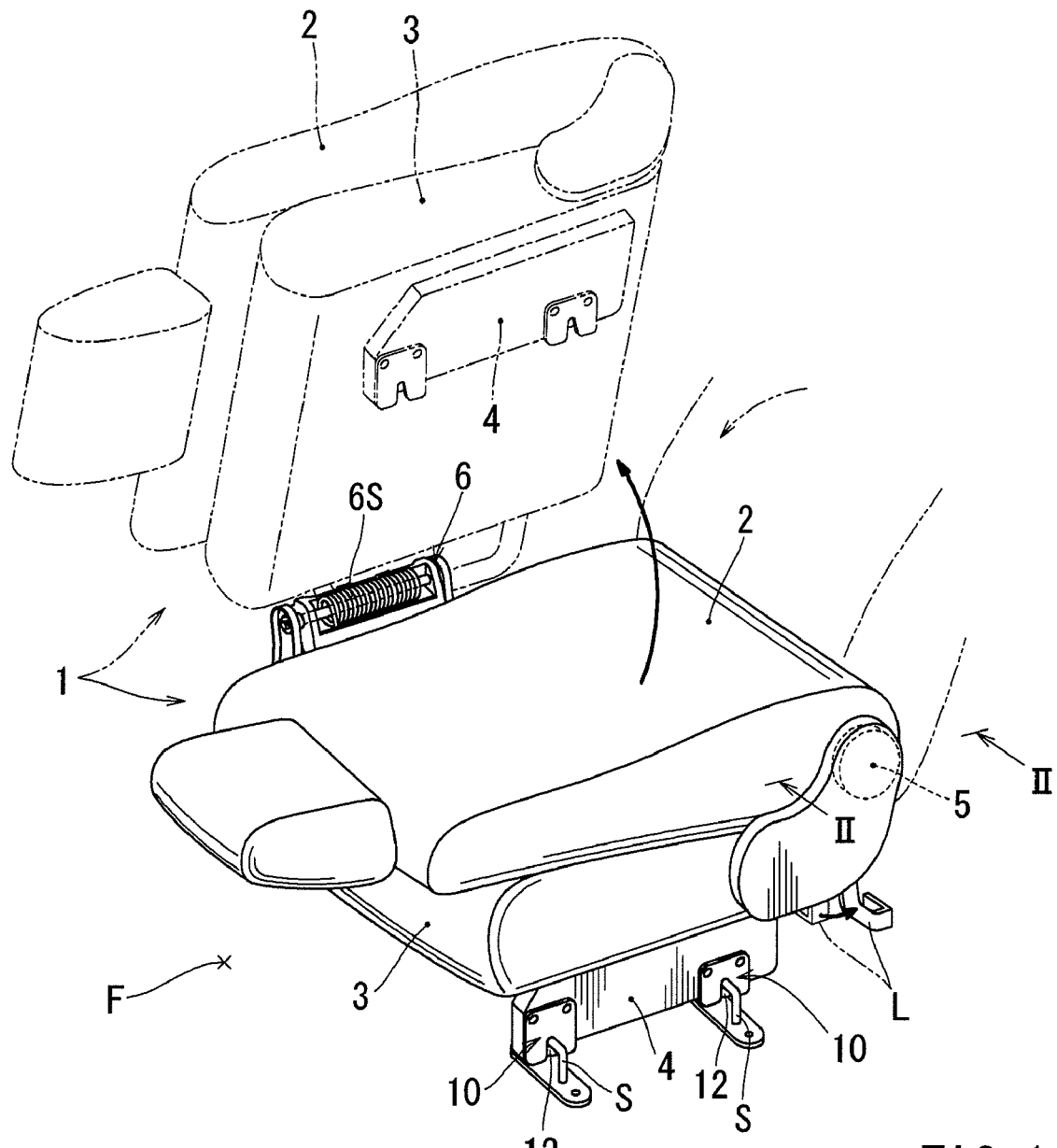
FIG. 1 is a schematic perspective view illustrating a storage structure of a vehicle seat according to a first embodiment of the present invention.

First, a configuration of a vehicle seat according to a first embodiment of the present invention is described with reference to FIGS. 1 to 7. As illustrated in FIG. 1, in the vehicle seat, a seat body 1 includes a seat back 2 serving as a backrest and a seat cushion 3 serving as a seated portion. In the seat back 2, lower end portions on both sides thereof in the width direction are connected to the seat cushion 3 through reclining devices 5 serving as rotation stop devices. In this case, each of the reclining devices 5 corresponds to a first lock canceling mechanism of the present invention.

Those reclining devices 5 are usually biased in the operating direction in which the reclining devices 5 are in locked states, and a backrest angle of the seat back 2 is in a fixed state. Each reclining device 5 is released from the locked state at once by drawing to the rear side a control lever L arranged on the bottom surface portion of the right rear portion side in the figure of the seat cushion 3.

In this case, each reclining device 5 includes a control member for switching control of canceling the mutual locked state. The control members are connected by a rod member (not shown). The locked states of the reclining devices 5 are cancelled at once by drawing the above-mentioned control lever L. Note that, each of the above-mentioned control members may be connected to a branch cable connected to the control lever L so that the locked states are cancelled at once by drawing the control lever L. As a result, the fixed state of the backrest angle of the seat back 2 is cancelled, and hence the seat back 2 enters into a state in which the backrest angle can be adjusted by the rotation movement about the shaft center of each of the reclining devices 5.

In this case, the seat back 2 is usually biased in the forward fold turning direction by a biasing force of a spring member (not shown) hooked between the seat back 2 and the seat cushion 3. Therefore, by drawing the control lever L in a state in which a passenger is not seated in the seat body 1, the seat back 2 naturally turns in the forward folding direction by the above-mentioned biasing, thereby being folded on the upper surface portion of the seat cushion 3.

Incidentally, the above-mentioned respective reclining devices 5 are usually biased in the operating direction in which the relining devices 5 are in the locked state, and hence the reclining devices 5 are automatically returned to the locked state by stopping the drawing control of the control lever L. However, in those reclining devices 5, there are set a lock zone in which they are returned to the locked state by stopping the drawing control of the control lever L, and a free zone in which they are not returned to the locked state even when the drawing control is stopped.

The former lock zone is usually set within the angle range in which a passenger seated on the seat body 1 uses the seat back 2 as the backrest, and set to a range between a turning position at which the seat back 2 is in the upright posture, and a turning position at which the seat back 2 is folded rearward as much as possible. Further, the latter free zone is set within the angle range in which the passenger does not use the seat back 2 while being seated on the seat cushion 3, and set to a range between the turning position at which the seat back 2 is in the upright posture, and a turning position at which the seat back 2 is folded forward as much as possible.

Therefore, when the seat back 2 is folded forward, as long as the seat back 2 is inclined forward if only a little by drawing the control lever L, the seat back 2 is naturally folded forward toward the upper surface portion of the seat cushion 3 even if the control of the control lever L is stopped. Note that, the basic configuration of the reclining devices 5 described above is the well-known configuration disclosed in documents such as Japanese Laid-Open Patent Publication No. 2002-360368, and hence detailed description thereof is omitted.

In this case, when the seat back 2 is folded to be switched to the folded posture, the seat body 1 is released from the engagement state with a floor F, and is flipped up to the storage position on the lateral side (window side) of the vehicle. Thus, by only one-time control of the control lever L, the seat body 1 is switched to the compact folded posture in which the seat back 2 is folding forward, and the seat body 1 in the folded posture can be stored at the storage position on the lateral side of the vehicle. As a result, the area on the floor F on which the seat body 1 is provided can be opened, and hence the area can be efficiently used as a baggage space and the like.

Incidentally, when the seat body 1 is at the use position on the floor F to be used by being seated, the bottom surface portion on the right side in the figure of the seat cushion 3 is interlocked with the floor F by a pair of lock devices 10 arranged back and forth in line as described below. In this case, the lock devices 10 correspond to a second lock cancelling mechanism of the present invention. Further, the portion on the left side in the figure of the seat cushion 3 is connected to the floor F by a tumble device 6, and is in a state of being allowed to tilt and turn toward the vehicle lateral side.

When the seat body 1 is used while being seated, the above-mentioned lock devices 10 are in the interlocked states with strikers S similarly arranged back and forth in line on the floor F. Further, the interlocked states between the lock devices 10 and the strikers S are cancel-controlled by a control cable CA pulling-controlled in conjunction with the forward folding movement of the seat back 2 described later in FIG. 4.

Further, to the above-mentioned tumble device 6, there is hooked a spring member 6S for constantly biasing the seat cushion 3 in the turning direction of being flipped up. Therefore, when the lock devices 10 are released from the interlocked states in accordance with the forward folding of the above-mentioned seat back 2, the seat body 1 is flipped up from the floor F to the lateral side of the vehicle by biasing in the state of folded posture in which the seat back 2 is folded forward.

In this case, on the bottom surface portion on the right side in the figure of the seat cushion 3, there is provided a support plate 4 for supporting the seat cushion 3 with respect to the floor F by serving as a vertical plate. The support plate 4 has an upper end portion which is pivotally connected to be capable of tilting and turning with respect to the skeleton frame (not shown) of the seat cushion 3. As a result, the support plate 4 can be shifted between the upright posture of hanging down straightly from the bottom surface portion of the seat cushion 3 and a folded-in posture of being folded-in so as to fit with the shape of the bottom surface portion of the seat cushion 3.

Though not shown, the support plate 4 is usually maintained, by a biasing force of a biasing spring hooked between the support plate 4 and the skeleton frame of the seat cushion 3, in a state of upright posture so as to function as a vertical plate. Further, though not shown in the figure similarly, in accordance with the movement of flipping up the seat body 1 from the floor F, the support plate 4 is drawn in the direction of being folded-in to fit with the shape of the bottom surface portion of the seat cushion 3.

As a result, when the seat body 1 is flipped up to the storage position, the support plate 4 is maintained in a state of being folded-in so as to fit with the shape of the bottom surface portion of the seat cushion 3. Further, in accordance with the movement of moving down the seat body 1 from the storage position to the use position on the floor F, the support plate 4 is gradually tipped up toward the lower side of the seat cushion 3 by being biased. As a result, when the seat body 1 is moved down to the use position on the floor F, the support plate 4 is in the upright state of hanging down straightly from the bottom surface portion of the seat cushion 3.

Further, the lock devices 10 are arranged at back and forth two positions of the lower end portion of the support plate 4. Those lock devices 10 are configured to be engaged/disengaged with respect to the strikers S similarly arranged at back and forth two positions on the floor F. Specifically, the lock devices 10 have operation structures of being interlocked with the strikers S when the strikers S are pushed into the lock devices 10 by the movement of moving down the seat body 1 onto the floor F.

Figure 6:
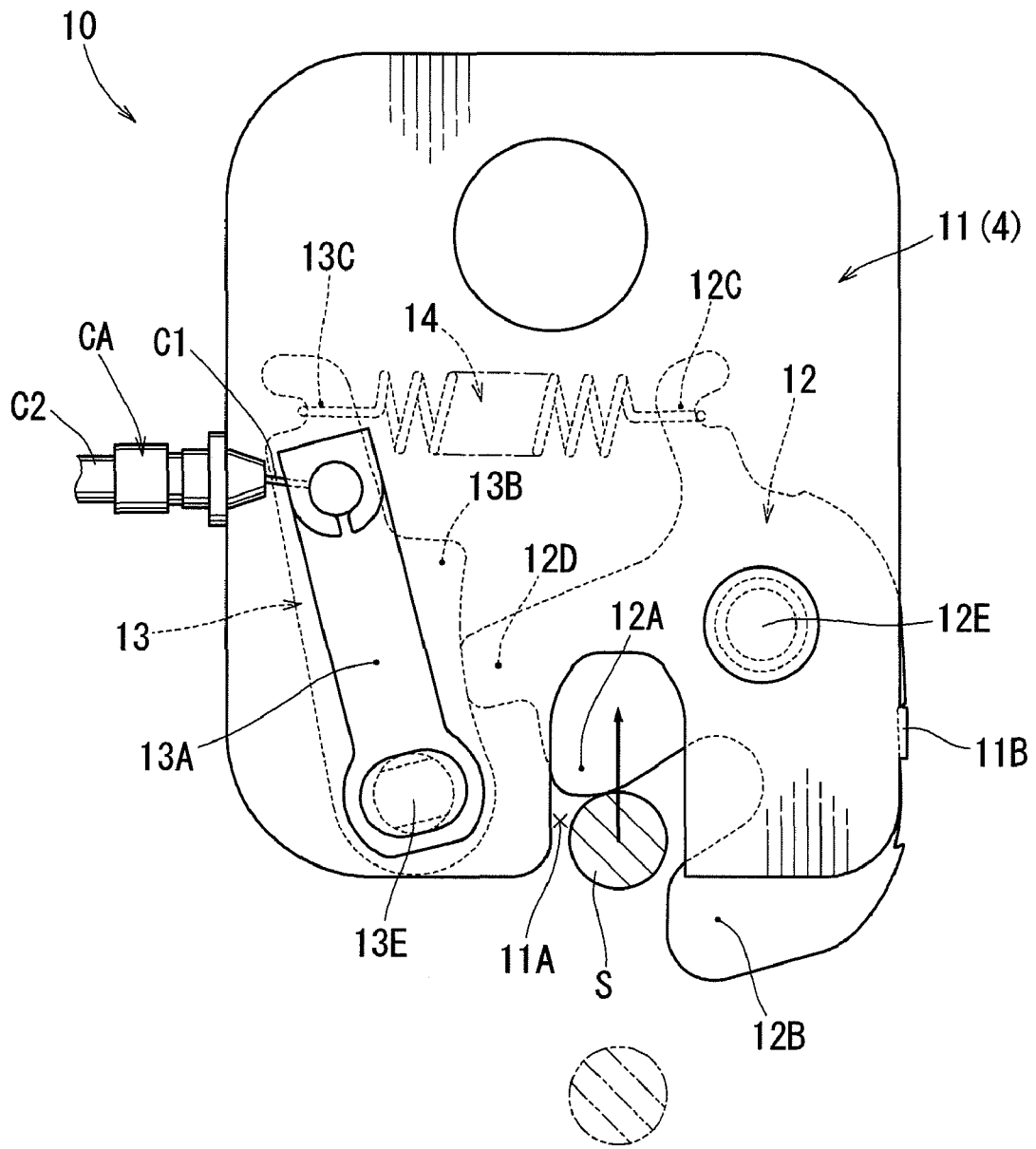
FIG. 6 is a configuration diagram illustrating a state before a lock device is pushed into a striker.

Next, locking structures of the lock devices 10 are described with reference to FIGS. 6 and 7. As illustrated in FIG. 6, each of the lock devices 10 includes a base plate 11 integrally connected to the support plate 4, a latch 12 and a pole 13 pivotally turnably connected to the base plate 11, and a tension spring 14 hooked between the latch 12 and the pole 13. Each of the lock devices 10 is configured so as to cause the latch 12 to interlock with the striker S by pushing the striker S in the interior of a receiving port 11A formed in the base plate 11.

In this case, the base plate 11 includes a pair of plates. Components such as the latch 12 are assembled between both the plates. Then, the latch 12 is pivotally turnably connected to the base plate 11 by a support shaft 12E. Further, the latch 12 usually receives a biasing force of the tension spring 14 hooked between a hook portion 12C thereof and a hook portion 13C of the pole 13, and the latch 12 is biased counterclockwise in the figure. Thus the latch 12 is maintained in a state of an initial position posture in which the latch 12 contacts with a stopper 11B formed in the base plate 11.

Figure 7:
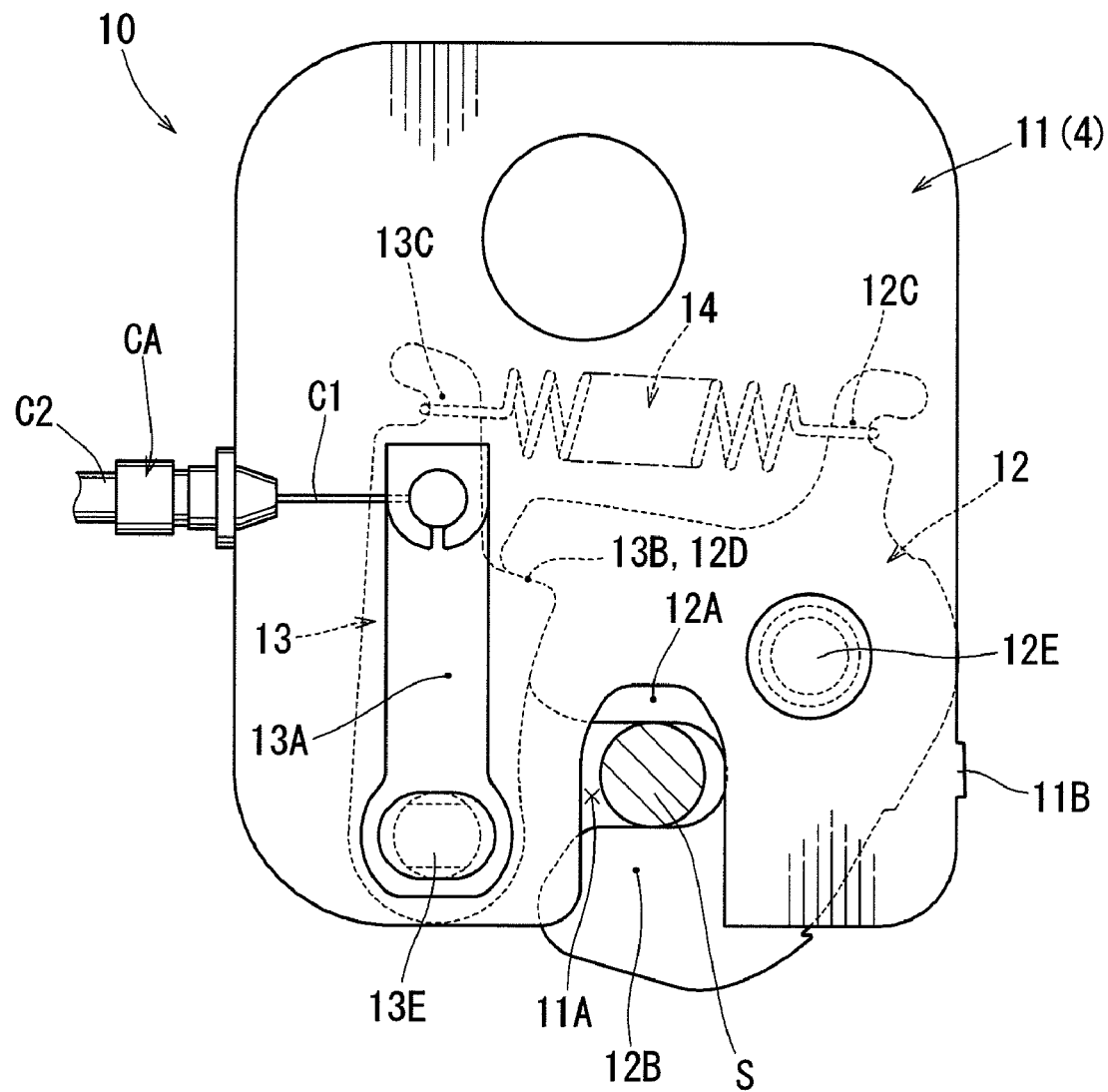
FIG. 7 is a configuration diagram illustrating a state in which the lock device and the striker are interlocked with each other.

In the latch 12, in the state of the initial position posture thereof, there are formed an upper jaw 12A projecting in the interior of the receiving port 11A formed in the base plate 11 and a lower jaw 12B moving, when the latch 12 turns clockwise from the initial position, so as to close the receiving port 11A (see FIG. 7). Further, in the latch 12, there is formed a corner portion 12D engaged, when the latch 12 turns clockwise from the initial position, with a claw portion 13B formed in the pole 13.

On the other hand, the pole 13 is pivotally turnably connected to the base plate 11 by the support shaft 13E. Further, the pole 13 usually receives a biasing force of the tension spring 14 hooked between the pole 13 and the latch 12 described above, and is maintained in a state of the initial position posture of being pressed against the corner portion 12D of the latch 12 as a state of being turnably biased clockwise in the figure. In the pole 13, there are formed a control arm 13A operation-controlled while being connected to the end portion of the control cable CA, which is pulling-controlled by forward folding of the seat back 2 described below in FIG. 4, and the claw portion 13B engaged, when the latch 12 turns clockwise from the initial position, with the corner portion 12D thereof.

Therefore, as illustrated in FIG. 6, in each of the lock devices 10 having the above-mentioned configuration, by the movement of pushing the striker S in the interior of the receiving port 11A of the base plate 11, the latch 12 having the upper jaw 12A exposed in the port is pushed so as to move clockwise. As a result, as illustrated in FIG. 7, the claw portion 13B of the pole 13 is drawn to the corner portion 12D of the latch 12 by the baising force of the tension spring 14 to be engaged with each other, and hence turning of the latch 12 is locked. Further, in accordance with the clockwise turning thereof, the lower jaw 12B moves behind the striker S so as to close the receiving port 11A. As a result, the striker S is maintained in the state of being interlocked by the latch 12 in the interior of the receiving port 11A.

That is, in the state before the pulling-control of the control cable CA is performed, each of the lock devices 10 having the above-mentioned configuration is in a lockable state in which the striker S can be interlocked with the latch 12 by the pushing-in control of the striker S. Further, as illustrated in FIG. 6, in each of the lock devices 10, by the pulling-control of the control cable CA, the control arm 13A is controlled so that the pole 13 is turning-controlled counterclockwise. As a result, the engaged state of the claw portion 13B of the pole 13 and the corner portion 12D of the latch 12 is cancelled, and hence the latch 12 turns counterclockwise by the biasing force of the tension spring 14.

As a result, the striker S is ejected from the receiving port 11A while being pushed out by the upper jaw 12A of the latch 12, and the interlocked state therebetween is cancelled. Further, the pulling-control of the control cable CA is cancelled, whereby the pole 13 re-enters into a state of being pressed against the corner portion 12D of the latch 12, and hence each of the locking devices 10 is returned to the lockable state in which interlocking with the striker S is possible.

Figure 2:
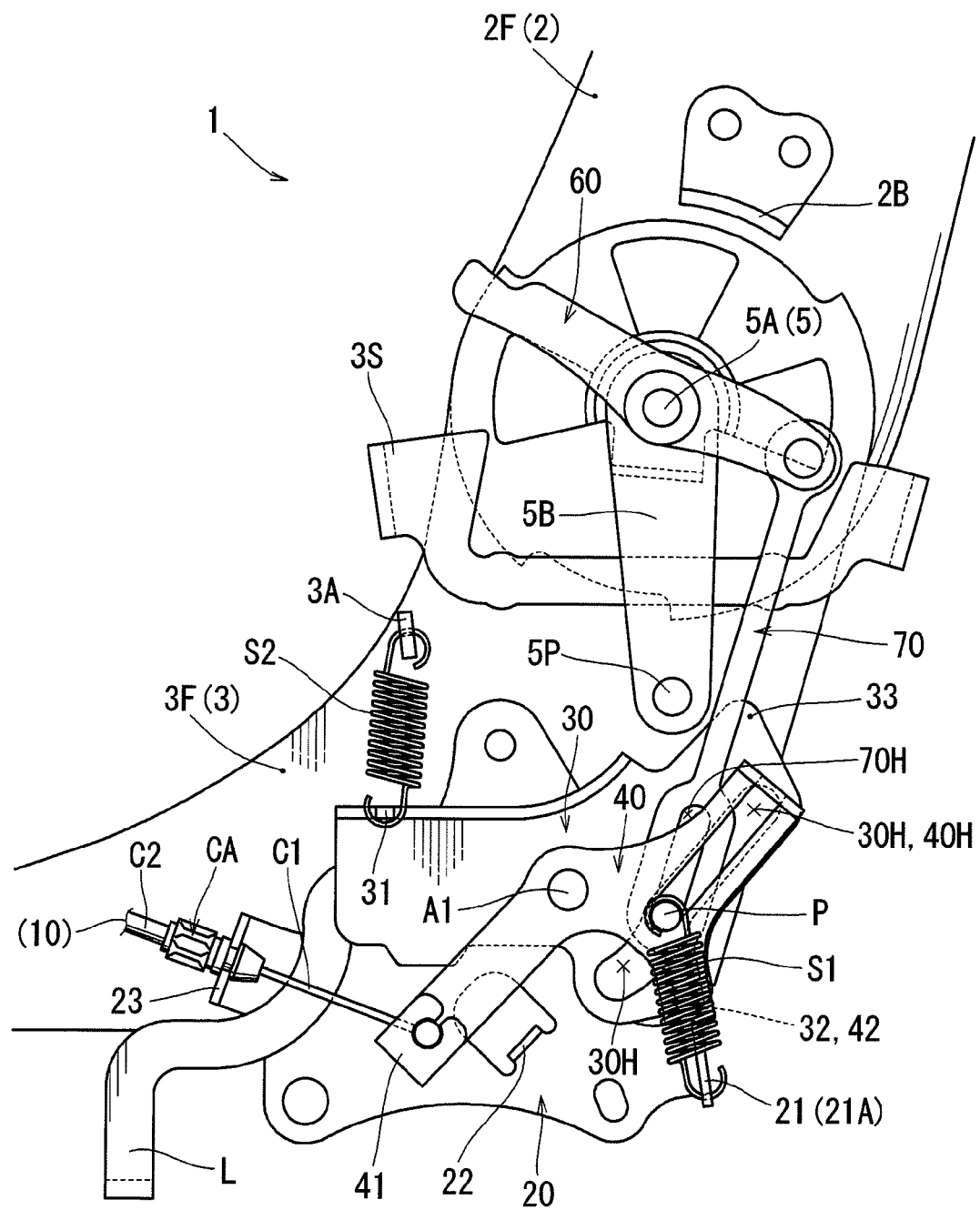
FIG. 2 is a configuration diagram illustrating an initial state of a lock canceling control mechanism of the vehicle seat.

Incidentally, control structure of the control lever L incorporates an erroneous operation preventing mechanism for preventing canceling of the interlocked states between the above-mentioned lock devices 10 and the strikers S unless the seat back 2 is folded forward. Hereinafter, the control structure of the control lever L is described in detail. In this case, FIG. 2 illustrates the control structure of the control lever L as the inner structural view seen from a section taken along the line II-II of FIG. 1.

As illustrated in the figure, the above-mentioned reclining device 5 is arranged so as to be sandwiched between plate surfaces of a back frame 2F and a cushion frame 3F constituting skeleton frames of the seat back 2 and the seat cushion 3, respectively, the reclining device 5 connecting the back frame 2F and the cushion frame 3F with each other. The operation state of the reclining device 5 is switched between the locked state and the unlocked state by the movement of turning-controlling a control shaft 5A inserted through the central portion thereof.

The control shaft 5A passes through the cushion frame 3F from the interior of the reclining device 5, and integrally connected to the upper end portion of a cancel arm 5B ahead thereof. In this case, in the usual case before the control lever L is drawing-controlled rearward (toward right side in the figure), the cancel arm 5B is maintained at the initial turning control position (position in the figure) in which the reclining device 5 is maintained in the locked state by a biasing force of a spring member (not shown) assembled to the reclining device 5.

Figure 3:
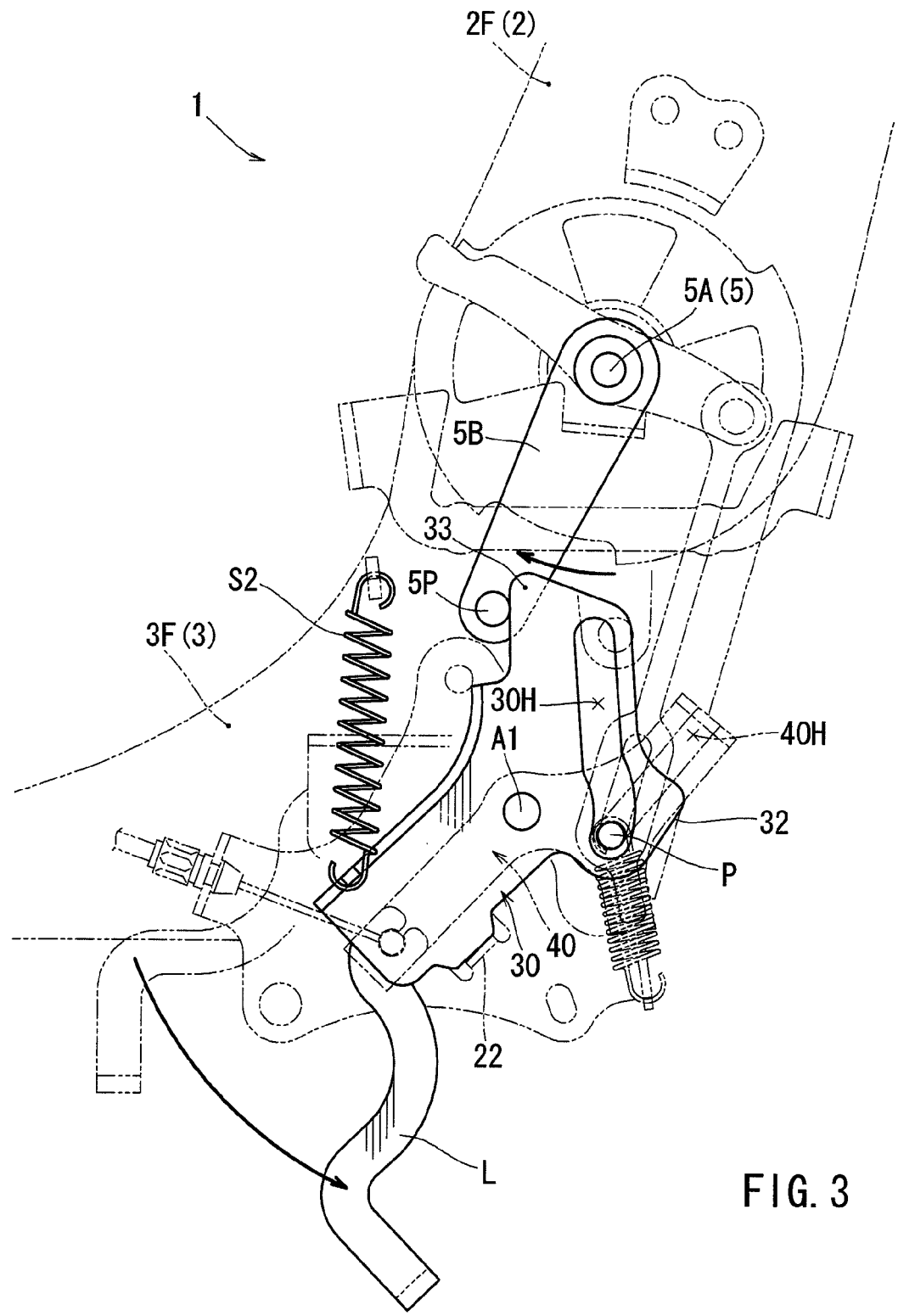
FIG. 3 is a configuration diagram illustrating a state in which a control lever is turning-controlled to a first turning position.

Further, as illustrated in FIG. 3, when the control lever L is drawing-controlled toward the right side in the figure, the cancel arm 5B is pushed to turn clockwise in the figure against the biasing thereof, to thereby cancel-control the locked state of the reclining device 5. The turning control for pushing the cancel arm 5B to turn clockwise is performed by pushing and moving a protruding pin 5P provided to protrude in the plate thickness direction at the lower end portion of the cancel arm 5B, the pushing and moving being performed by a pressure portion 33 of a first control member 30 described later.

On the other hand, referring back to FIG. 2, components for performing turning control of the above-mentioned cancel arm 5B are assembled to the cushion frame 3F. Specifically, a flat-plate-like base plate 20 for assembling the above-mentioned components is first integrally fixed to the cushion frame 3F. The base plate 20 is provided with a turning stopper 21 formed at the lower right end in the figure thereof, for restricting clockwise turning in the figure of the first control member 30 and a second control member 40 described later.

Further, as illustrated in FIG. 3, at the lower position on the central side in the figure of the base plate 20, there is formed a turning stopper 22 for restricting counterclockwise turning in the figure of the first control member 30. Further, with respect to a cable hook portion 23 formed at the end portion on the left side in the figure of the base plate 20, the end portion of an outer cable C2 of the control cable CA having a double structure is hooked and fixed. Those turning stoppers 21 and 22 and the cable hook portion 23 are formed by partially bending the base plate 20 in the plate thickness direction.

Further, the flat-plate-like first control member 30 is pivotally turnably connected to the base plate 20 by a connection shaft A1. In this case, the connection shaft A1 corresponds to the shaft member of the present invention. The connection shaft A1 is integrally fixed to the base plate 20, and pivotally turnably supports the first control member 30.

Further, the above-mentioned control lever L is integrally welded and fixed to the first control member 30. Further, one end of the tension spring S2 is hooked to a spring hook portion 31 formed at the end portion on the upper left side in the figure of the first control member 30. The other end of the tension spring S2 is hooked to a spring hook portion 3A formed in the cushion frame 3F. Thus, the tension spring S2 turns and biases the first control member 30 with respect to the base plate 20 clockwise in the figure so as to maintain the first control member 30 in a state at the illustrated initial position.

Further, at the end portion on the lower right side in the figure of the first control member 30, there is formed a return control portion 32 for pushing-controlling clockwise in the figure an engagement portion 42 formed in a second control member 40. As illustrated in FIG. 3, in accordance with turning movement of the first control member 30 clockwise in the figure by biasing of the tension spring S2, the return control portion 32 pushes and moves the engagement portion 42 so as to press the same against the turning stopper 21 formed in the base member 20. Thereby, as illustrated in FIG. 2, the first control member 30 and the second control member 40 are maintained in the state at the initial position of being brought into contact with the turning stopper 21 by biasing of the tension spring S2.

Further, in a plate portion on the right side in the figure with respect to a turning center (connection shaft A1) of the first control member 30, there is formed an elongated hole 30H passing through the first control member 30 in a plate thickness direction. The elongated hole 30H has a straight portion extending around the turning center of the first control member 30 and a circular arc portion extending around the turning center thereof, which are formed continuously with each other. Specifically, in the elongated hole 30H, in a state in which the first control member 30 is maintained at the illustrated initial position, its straight extending portion is arranged and formed so as to overlap (conform to) an elongated hole 40H which extends straight and is formed in the second control member 40.

Further, in a region on the upper end side in the figure of the first control member 30, there is formed a pressure portion 33 protruding outwardly in a radial direction. As illustrated in FIG. 3, by turning the first control member 30 counterclockwise in the figure against biasing of the tension spring S2, the pressure portion 33 is brought into contact with the protruding pin 5P of the cancel arm 5B so as to push and move the same in a turning direction. Here, FIG. 3 illustrates a state in which the first control member 30 is turned to a first turning position.

Further, referring back to FIG. 2, the flat-plate-like second control member 40 is pivotally turnably connected to the connection shaft A1 which pivotally supports the first control member 30. The second control member 40 is disposed in a state in which its plate surface is opposed to a plate surface of the first control member 30, and is assembled to the first control member 30 so as to be turnable about the connection shaft A1.

An end portion of an inner cable C1 of the control cable CA is hooked to a cable hook portion 41 formed at the end portion on the lower left side in the figure of the second control member 40. Further, at the end portion on the lower right side in the figure of the second control member 40, there is formed the engagement portion 42 subjected to pushing and moving control clockwise in the figure by the return control portion 32 formed in the first control member 30. The cable hook portion 41 and the engagement portion 42 are formed by bending a part of the second control member 40 in the plate thickness direction.

Further, in a plate portion on the right side in the figure with respect to a turning center (connection shaft A1) of the second control member 40, there is formed the elongated hole 40H passing through the second control member 40 in the plate thickness direction. The elongated hole 40H is formed into a straight shape extending around the turning center of the second control member 40. As described above, in a state in which the second control member 40 is maintained at the initial position by a biasing force of the tension spring S2 together with the first control member 30, the elongated hole 40H is arranged and formed so as to overlap the straight extending portion of the elongated hole 30H formed in the first control member 30.

Further, through a space portion in which both the elongated holes 30H and 40H overlap each other, an engagement pin P is inserted so as to pass through both the elongated holes 30H and 40H. The engagement pin P can slide and move along hole shapes obtained by overlapping both the elongated holes 30H and 40H. Here, the engagement pin P is usually maintained at the end portion on the lower left side in the figure of the elongated hole 40H by biasing of a tension spring S1 which is hooked between the engagement pin P and a spring hook portion 21A formed at the end portion on the lower right side in the figure of the base plate 20. In a state in which both the first control member 30 and the second control member 40 are at the initial position, the engagement pin P is positioned between the straight extending portion of the elongated hole 30H and the circular-arc shaped extending portion thereof.

Therefore, when the first control member 30 is turned counterclockwise in the figure in the state at the initial position, as illustrated in FIG. 3, the first control member 30 is turned without interfering with respect to the engagement pin P owing to the shape of the elongated hole 30H extending in a circular arc manner. Thus, in turning for cancel-controlling the reclining device 5, the first control member 30 is individually turned without turning the second control member 40.

Here, the engagement pin P is connected to a control link 70 which is lifting-up-controlled in conjunction with forward folding movement of the seat back 2 as described later. The engagement pin P is forcibly controlled so as to slide to the upper side in the figure in conjunction with forward folding movement of the seat back 2. Therefore, as illustrated in FIG. 3, in a case where the first control member 30 is turning-controlled and thus extending directions of both the elongated holes 30H and 40H are different from each other, the engagement pin P is controlled so as to slide in accordance with the following forcible shift.

Figure 4:
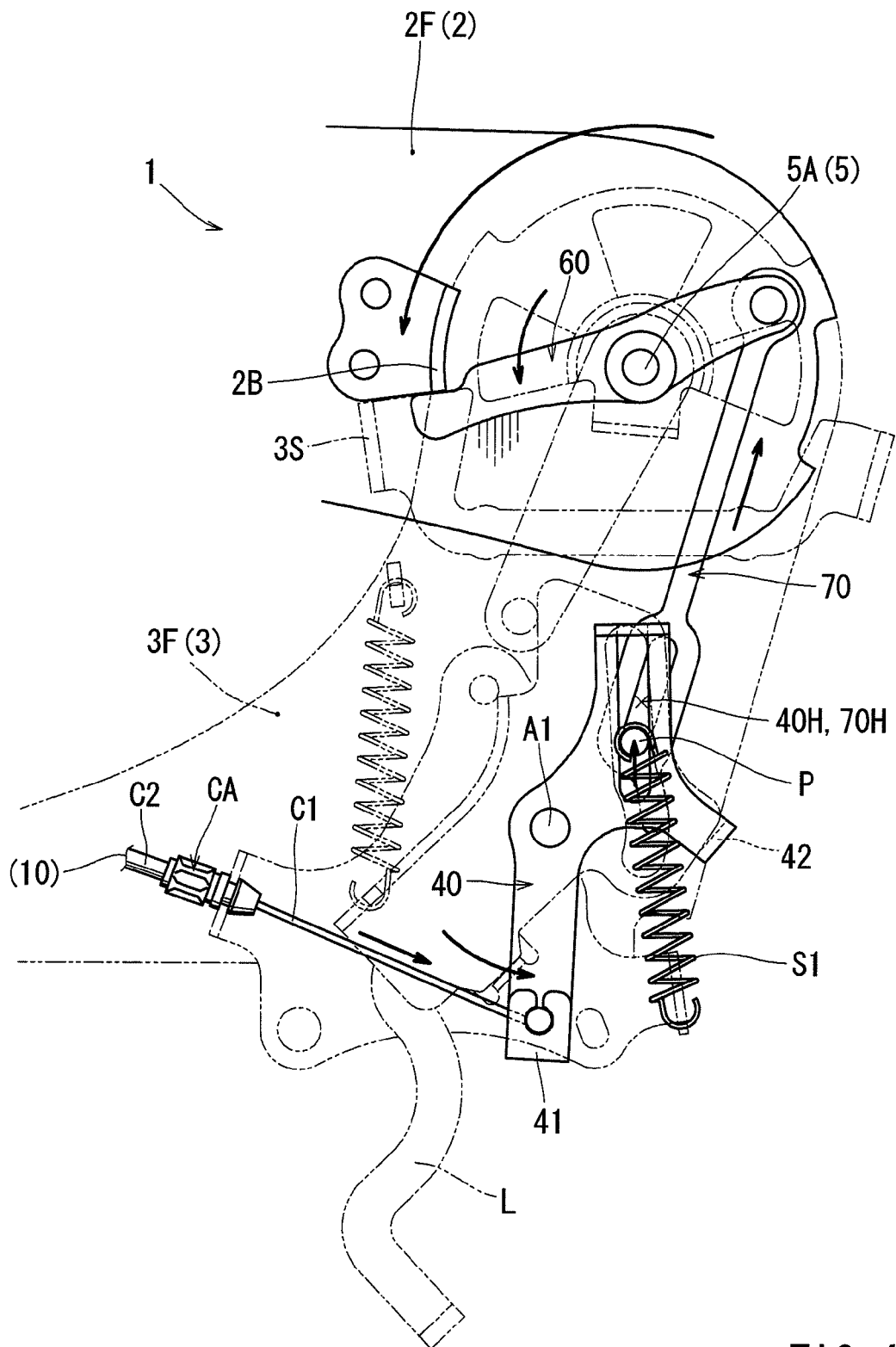
FIG. 4 is a configuration diagram illustrating a state in which a seat back is folded forward and a control cable is pulling-controlled.

That is, when the engagement pin P is forcibly lifted up to the upper side in the figure by the control link 70, the engagement pin P slides and moves in both the elongated holes 30H and 40H while causing a forcible pulling force to act so as to conform hole shapes of both the elongated holes 30H and 40H to each other. Thus, as illustrated in FIG. 4, by receiving a forcible pulling-control force from the engagement pin P, the second control member 40 is turned and shifted counterclockwise in the figure with respect to the first control member 30 maintained at the first turning position. Thereby, the end portion of the inner cable C1 of the control cable CA is pulling-controlled while being pulled out from an end portion of an outer cable C2.

Next described is a mechanism for slide-controlling the above-mentioned engagement pin P to the upper side in the figure. That is, as illustrated in FIG. 2, a rocking link 60 is pivotally turnably connected to the control shaft 11 of the above-mentioned reclining device 5. The rocking link 60 is freely turned with respect to the control shaft 5A, and is usually maintained in a state at an initial turning position illustrated in the figure by the control link 70 which is linked and connected to its right end portion in the figure.

As illustrated in FIG. 4, in accordance with forward folding movement of the seat back 2 which is generated by canceling a locked state of the reclining device 5, the rocking link 60 is pushed and turned counterclockwise in the figure while being pushed and moved by a pushing member 2B attached to the back frame 2F. Thus, the rocking link 60 controls to lift up the control link 70 to the upper side, the control link 70 is linked and connected to a right end portion of the rocking link 60.

Note that, the above-mentioned forward folding movement of the seat back 2 is regulated at a position in which the pushing member 2B is brought into contact with a forward fold stopper 3S fixed to the cushion frame 3F. Further, referring back to FIG. 2, the control link 70 linked and connected to the above-mentioned rocking link 60 is formed into an arm-like shape extending in the vertical direction in the figure. In the control link 70, its lower end portion is provided so as to be sandwiched between the plate surface of the first control member 30 and the plate surface of the second control member 40.

In the lower end portion of the control link 70, there is formed an elongated hole 70H extending in a link longitudinal direction. Further, the engagement pin P, which is inserted through both the above-mentioned elongated holes 30H and 40H, is inserted through the elongated hole 70H so as to be capable of moving and sliding therein. As illustrated in FIG. 4, the seat back 2 is folded forward by turning control of the control lever L, whereby the control link 70 is lifted up by the rocking link 60 and thus slides and moves the engagement pin P while lifting up the same to the upper side.

The movement of control structure of the above-mentioned control lever L is summarized as follows. That is, the control lever L, in its pre-operating state, is maintained in the state at the initial turning position illustrated in FIG. 2. In this state, the reclining device 5 is in a locked state of fixing a backrest angle of the seat back 2. Then, when the control lever L is turned counterclockwise in the figure through drawing control in this state, the first control member 30 is turned to the first turning position illustrated in FIG. 3. Thus, the pressure portion 33 pushes and moves the protruding pin 5P of the cancel arm 5B, and the locked state of the reclining device 5 is cancelled. Note that, the second control member 40 is not turned in the movement so far, and maintained in the state at the initial turning position.

With this configuration, the fixed state of the backrest angle of the seat back 2 is cancelled, and as illustrated in FIG. 4, the seat back 2 is folded forward to a position of being folded on the upper surface portion of the seat cushion 3. Thus, the control link 70 connected to the rocking link 60 is lifted up to the upper side in the figure, and the engagement pin P is controlled so as to slide in the same direction, whereby the second control member 40 is turned counterclockwise in the figure. Thereby, the control cable CA is pulling-controlled, and an interlocked state of the seat body 1 and the floor F is cancelled. The seat body 1 is tipped up from a use position on the floor F to a storage position in the state in which the seat back 2 is tilted down in a folded posture, and thus is stored.

That is, once the control lever L is turning-controlled to the first turning position, its operating state is kept, whereby it is possible to continuously perform the following two kinds of control: canceling the locked state of the reclining device 5 and folding the seat back 2 forward; and further canceling the interlocked state of the seat body 1 and the floor F. In addition, the control lever L is designed not to cause erroneous operation in order to prevent canceling the interlocked state of the seat body 1 and the floor F through pulling control of the control cable CA unless the seat back 2 is folded forward.

Figure 5:
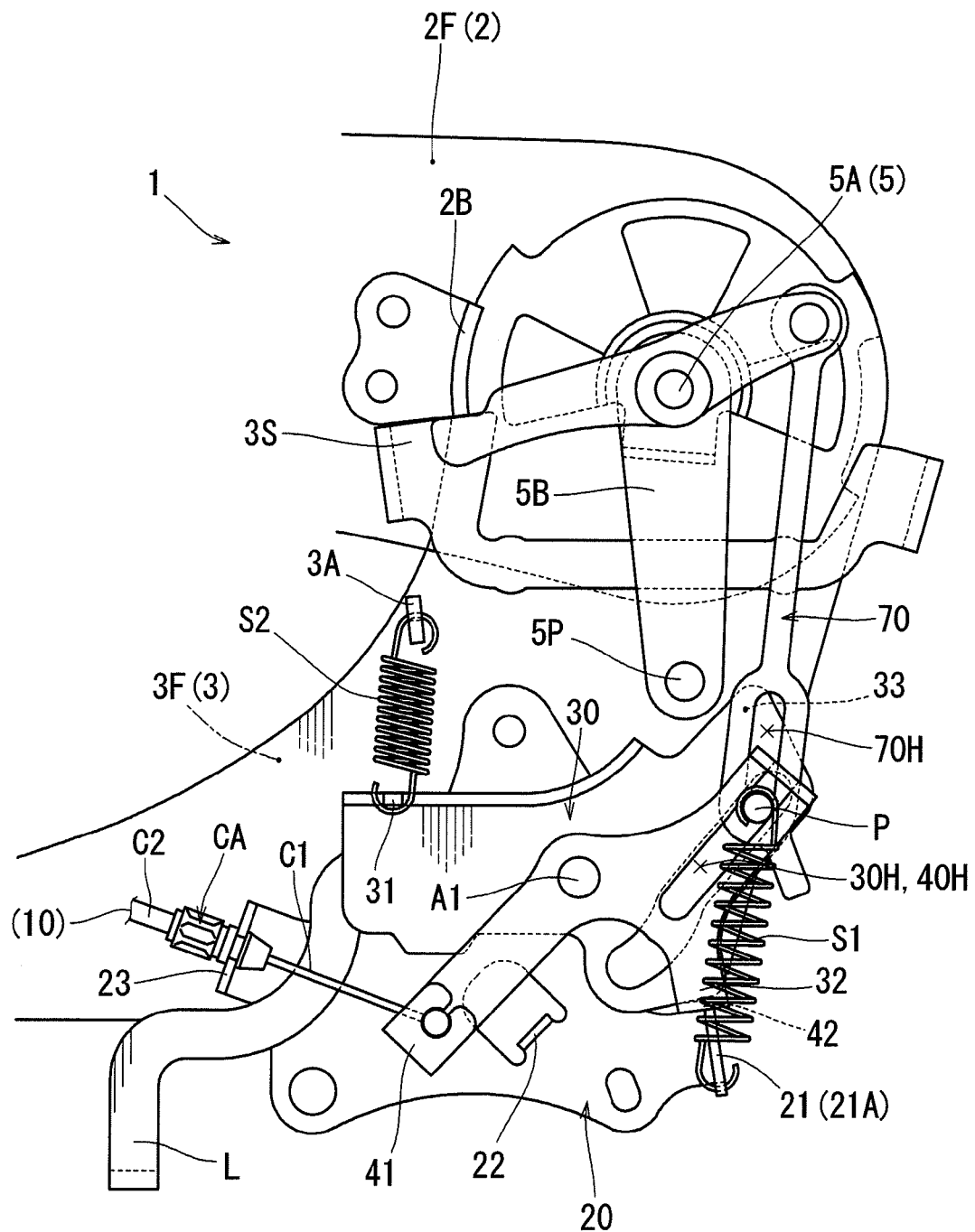
FIG. 5 is a configuration diagram illustrating a state in which turning control of the control lever is stopped while the seat back is folded forward.

Here, turning control of the control lever L is stopped while the above-mentioned seat back 2 is folded forward, whereby the first control member 30 and the second control member 40 are, as illustrated in FIG. 5, returned to the state of the initial position posture. However, the fixed state of the backrest angle of the seat back 2 is cancelled, and hence turning is continued to the position where the seat back 2 is completely folded forward as illustrated in the figure. Therefore, also in this case, the rocking link 60 is subjected to pushing and moving control and the control link 70 is subjected to lifting-up control, and hence the engagement pin P is also forcibly controlled to slide.

However, in this case, in the elongated hole 30H of the first control member 30 and the elongated hole 40H of the second control member 40, their hole shapes extending straight conform to each other. Therefore, in this case, the engagement pin P moves in the upper right direction in the figure along the hole shapes extending straight of both the elongated holes 30H and 40H, and movement of the engagement pin P is stopped at the position within the hole shapes extending straight. Thus, the first control member 30 and the second control member 40 are integrally engaged with each other in the turning direction by the engagement pin P.

Therefore, in this case, the second control member 40 is not turning-controlled even if the seat back 2 is folded forward, and hence the seat body 1 is maintained at the use position on the floor F in the state in which the seat back 2 is folded forward. Then, in this state, the control lever L is turning-controlled again counterclockwise in the figure, whereby the first control member 30 and the second control member 40 are integrally turning-controlled in the turning direction. Thus, the control cable CA is pulling-controlled, and the seat body 1 in the state of the folded posture is flipped up from the use position on the floor F to the storage position to thereby be stored.

As described above, according to the vehicle seat of this embodiment, there is adopted the configuration in which the second control member 40 is turning-controlled by folding the seat back 2 forward, whereby it is possible to prevent canceling the interlocked state of the seat body 1 and the floor F unless the seat back 2 is folded forward. Therefore, the above-mentioned operation can be performed without erroneous operation solely through one-time turning control of the control lever L (first control member 30), and hence it is possible to easily perform serial control which is carried out until the interlocked state of the seat body 1 and the floor F is cancelled.

As described above, by selectively switching whether or not the operating state of the control lever L (first control member 30) is continued, it is possible to select whether or not the interlocked state of the floor F and the seat body 1 including the folded seat back 2 is cancelled. Moreover, there is adopted the configuration in which the hole shapes of both the elongated holes 30H and 40H conform to each other by stopping the turning control of the first control member 30. As a result, when the turning control of the control lever L is stopped while the seat back 2 is folded forward, it is possible to prevent turning-controlling the second control member 40 even if the seat back 2 is folded forward. Thereby, it is possible to cause the seat body 1 including the folded seat back 2 to stay on the floor F.

Moreover, by folding the seat back 2 forward, the engagement pin P slides and moves in conjunction with this movement, whereby it is possible to integrally connect the first control member 30 and the second control member 40 to each other in the turning direction. Therefore, the control lever L, which has been stopped to be controlled once, is re-controlled, whereby it is possible to cancel the interlocked state of the floor F and the seat body 1 in the folded posture in which the seat back 2 is folded forward.

Moreover, the first control member 30 and the second control member 40 are pivotally turnably connected to each other by the common connection shaft A1 (shaft member), whereby the first control member 30 and the second control member 40 are turned at the coaxial position. Therefore, compact configuration can be realized and assembled components can be rationalized. Moreover, the lock canceling control mechanism is applied to the storage control structure of the vehicle seat of stowable type, whereby it is possible to easily perform control for storing the seat body 1 to the storage position in the folded compact posture without erroneous operation.

As described above, the embodiment of the present invention is described with reference to one embodiment. However, the present invention can be realized in various modes other than the above-mentioned embodiment. For example, the lock canceling control mechanism can be applied to a mechanism of other type in which storing is performed by flipping up the vehicle seat to the front side of the vehicle or by moving down the vehicle seat into the recess formed in the floor. That is, the lock canceling control mechanism of the present invention can be applied to structure for various mechanisms used for the purpose of folding the seat back forward through control of the control lever and canceling the interlocked state between the vehicle seat and the floor.

Further, while there are described the elongated holes (guide paths) which are arranged and formed in both the control members so that their guiding shapes conform to each other in the state at the initial position, the guiding shapes do not necessarily have to conform to each other. However, in this case, by stopping turning control of the control lever while the seat back is tilted down, the engagement pin slides and moves, and the second control member is turned and controlled. Therefore, even if the control of the control lever is stopped at this stage, the interlocked state of the vehicle seat and the floor is cancelled once, and hence there is required control for moving down the vehicle seat onto the floor again and interlocking the vehicle seat with the floor.

The invention claimed is:

1. A vehicle seat capable of moving, in a state of folded posture in which a seat back is folded down, from an installation position on a floor to a storage position in a vehicle interior so as to be stored in the storage position through forward folding of the seat back and canceling of an interlocked state between the vehicle seat and the floor, the vehicle seat comprising:
   a first lock canceling mechanism capable of releasably fixing a backrest angle of the seat back with respect to a seat cushion;
   a second lock canceling mechanism capable of one of engaging and disengaging the vehicle seat with respect to the floor;
   a first control member provided so as to be turning-controlled with respect to the vehicle seat; and
   a second control member provided so as to be turning-controlled integrally with the first control member by engagement with the first control member,
   wherein the first lock canceling mechanism is maintained in a state in which the backrest angle of the seat back is fixed, and the first lock canceling mechanism cancels the fixed state of the backrest angle through a canceling control of the first control member provided in the vehicle seat to switch the seat back into a forward foldable state when the first control member is set to a cancel-controlled state,
   the first control member is set to the cancel-controlled state when the first control member is one of maintained and held at a turning position, and the first control member is set to a default state when the first control member is returned to a default position, and
   wherein the second lock canceling mechanism is maintained in a state in which the vehicle seat is interlocked with the floor, the second lock canceling mechanism operates to cancel the interlocked state between the vehicle seat and the floor when the seat back enters into a forward folded state and the control member is set to the cancel-controlled state, and the second lock canceling mechanism keeps the interlocked state between the vehicle seat and the floor when the first control member is set to the default state and-the seat back is folded forward,
   wherein the first control member includes a first guide path extending in a plane direction perpendicular to a center axis of turning thereof and forming a first guiding shape, and the second control member includes a second guide path extending in a plane direction perpendicular to a center axis of turning thereof and forming a second guiding shape, and a slide member is provided between the first guide path and the second guide path so as to pivotally pass through the first guide path and the second guide path, the slide member being moved so as to slide along guiding shapes conforming each other, the slide member forcibly turning and shifting one of the first control member and the second control member with respect to one another while conforming the first and second guiding shapes in accordance with the sliding movement when extending directions of the first and second guiding shapes are different from each other, and
   wherein the first lock canceling mechanism, which fixes the backrest angle of the seat back, is cancel-controlled through turning of the first control member to a first turning position, and the first control member, when turning to the first turning position, turns relatively to the second control member without interfering with the slide member by the first guiding shape of the first guide path, and the fixed state of the backrest angle is cancelled through the forward folding of the seat back, then the slide member is controlled to slide in conjunction with this movement, thereby the slide member forcibly shift the first and second guide paths directed in different directions, and the second control member relatively turns with respect to the first control member by the movement of the slide member, thereby the second lock canceling mechanism, which interlocks the vehicle seat and the floor with each other, is cancel-controlled.

2. A vehicle seat as in claim 1, wherein the first and second guiding shapes conform to each other in a state in which the first control member is at an initial position before being subjected to turning control.

3. A vehicle seat as in claim 2, wherein when the control of the first control member is stopped while the seat back is folded forward and the first control member is returned to the initial position, the slide member is moved so as to slide along the first and second guiding shapes, which conform to each other, in conjunction with forward folding movement of the seat back, to thereby cause the first control member and the second control member to integrally engage with each other in a turning direction.

4. A vehicle seat as in claim 3, wherein the first control member and the second control member are pivotally turnably supported by a common shaft member.

5. A vehicle seat as in claim 4, wherein the first control member and the second control member are formed into a flat-plate shape, and the first guide path and the second guide path are formed as elongated holes formed in the first control member and the second control member so as to pass therethrough in a plate thickness direction, and the slide member is constituted as an engagement pin inserted through the elongated holes.

6. A vehicle seat as in claim 1, wherein the slide member is controlled to slide when a control link is pulled by the forward folding of the seat back.

* * * * *